US012427771B2

(12) United States Patent
Hoshi

(10) Patent No.: US 12,427,771 B2
(45) Date of Patent: Sep. 30, 2025

(54) LIQUID DISCHARGE HEAD, HEAD MODULE, AND LIQUID DISCHARGE APPARATUS

(71) Applicant: Katsuhiro Hoshi, Kanagawa (JP)

(72) Inventor: Katsuhiro Hoshi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 154 days.

(21) Appl. No.: 18/197,116

(22) Filed: May 15, 2023

(65) Prior Publication Data

US 2023/0382115 A1 Nov. 30, 2023

(30) Foreign Application Priority Data

May 25, 2022 (JP) ................................ 2022-085262

(51) Int. Cl.
*B41J 2/14* (2006.01)

(52) U.S. Cl.
CPC ......... *B41J 2/1433* (2013.01); *B41J 2/14209* (2013.01); *B41J 2002/14362* (2013.01)

(58) Field of Classification Search
CPC .................. B41J 2/1433; B41J 2/14209; B41J 2002/14362; B41J 2/14201; B41J 2202/05
USPC ............................................................ 347/47
See application file for complete search history.

(56) References Cited

U.S. PATENT DOCUMENTS 4,803,501 A * 2/1989 Mielke ...................... B41J 2/04 347/54
5,065,978 A * 11/1991 Albarda ................ F04B 43/046 257/419
2012/0105522 A1* 5/2012 Wallsten .................. B41J 2/175 347/44
2012/0139996 A1* 6/2012 McNestry .................. B41J 2/14 347/44
2016/0169180 A1* 6/2016 McAlister .............. F02M 61/08 239/584
(Continued)

FOREIGN PATENT DOCUMENTS

JP 2003-305841 10/2003
JP 2004-142382 5/2004
(Continued)

OTHER PUBLICATIONS

Extended European Search Report issued Oct. 10, 2023, in corresponding EP Application 23174518.3, 5pp.

*Primary Examiner* — Jason S Uhlenhake
*Assistant Examiner* — Alexander D Shenderov
(74) *Attorney, Agent, or Firm* — XSENSUS LLP

(57) ABSTRACT

A liquid discharge head includes: a housing; a nozzle plate attached to the housing, the nozzle plate having a nozzle from which a liquid is to be discharged; a valve in the housing, the valve configured to move in an opening and closing direction and openably close the nozzle; a driver having one end coupled to the valve in the opening and closing direction, the driver configured to drive the valve; and a fixing member fixed to the housing and coupled to another end of the driver in the opening and closing direction. The driver has a first linear expansion coefficient, each of the valve and the fixing member has a second linear expansion coefficient, and the first linear expansion coefficient and the second linear expansion coefficient are reversed in positivity and negativity.

15 Claims, 6 Drawing Sheets

(56) References Cited

U.S. PATENT DOCUMENTS

2023/0278338 A1 * 9/2023 Kubo .................. B41J 2/14201
347/20

FOREIGN PATENT DOCUMENTS

| | | |
|---|---|---|
| JP | 2010-168952 | 8/2010 |
| JP | 2010-241003 | 10/2010 |
| JP | 2020-168785 | 10/2020 |
| JP | 2022-73547 A | 5/2022 |

* cited by examiner

LIQUID DISCHARGE HEAD, HEAD MODULE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-085262, filed on May 25, 2022, in the Japan Patent Office, the entire disclosure of each of which is hereby incorporated by reference herein.

BACKGROUND

Technical Field

The present embodiment relates to a liquid discharge head, a head module, and a liquid discharge apparatus.

Related Art

A droplet discharge head pressurizes and supplies a discharge liquid to a cavity communicating with a nozzle. The droplet discharge head includes a pin to close the nozzle, an actuator to separate the pin from the nozzle and bring the pin into contact with the nozzle, and a control device to control the actuator, so that the pressurized and supplied discharge liquid is discharged as droplets from the nozzle only while the pin is separated from the nozzle.

SUMMARY

In an aspect of the present disclosure, a liquid discharge head includes: a housing; a nozzle plate attached to the housing, the nozzle plate having a nozzle from which a liquid is to be discharged; a valve in the housing, the valve configured to move in an opening and closing direction and openably close the nozzle; a driver having one end coupled to the valve in the opening and closing direction, the driver configured to drive the valve; and a fixing member fixed to the housing and coupled to another end of the driver in the opening and closing direction. The driver has a first linear expansion coefficient, each of the valve and the fixing member has a second linear expansion coefficient, the first linear expansion coefficient and the second linear expansion coefficient are reversed in positivity and negativity, and the driver is coupled to each of the valve and the fixing member via a heat transfer layer.

In another aspect of the present disclosure, a liquid discharge head includes: a housing; a nozzle plate attached to the housing, the nozzle plate having a nozzle from which a liquid is to be discharged; a valve in the housing, the valve configured to move in an opening and closing direction and openably close the nozzle; a driver having one end coupled to the valve in the opening and closing direction, the driver configured to drive the valve; a fixing member fixed to the housing and coupled to another end of the driver in the opening and closing direction; and an adjuster between the fixing member and said another end of the driver. The driver has a first linear expansion coefficient, each of the valve, the adjuster, and the fixing member has a second linear expansion coefficient, and the first linear expansion coefficient and the second linear expansion coefficient are reversed in positivity and negativity.

According to the present embodiment, it is possible to suppress the displacement of a driver itself due to the heat generation of the driver and maintain a target discharge state.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
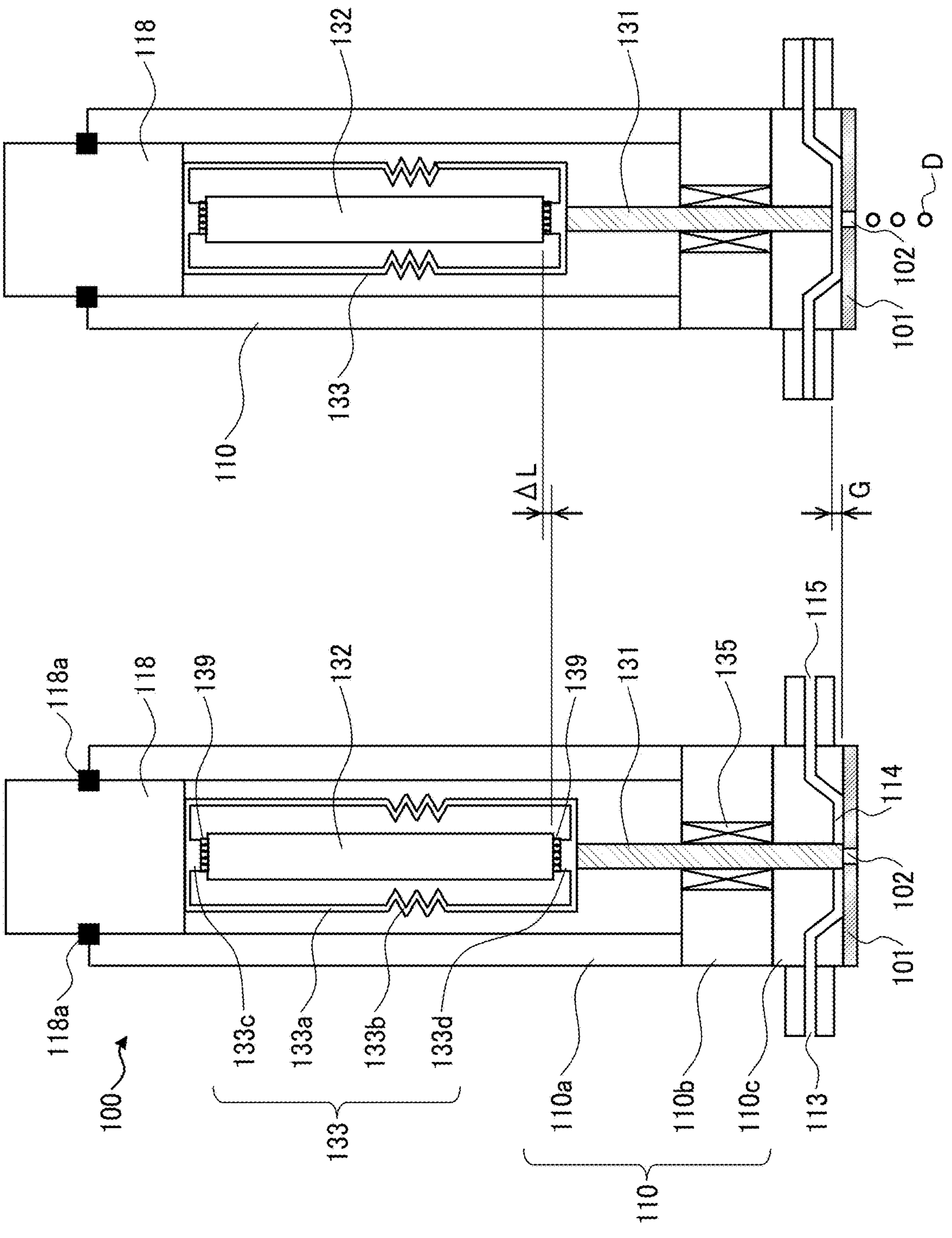
FIGS. 1(A) and 1(B) are explanatory views illustrating the configuration of a liquid discharge head according to a first embodiment of the present embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

As used herein, the term "couple" means to join, connect, attach, adhere, affix, or bond, whether directly or indirectly, and whether permanently or temporarily.

Hereinafter, embodiments for carrying out the invention will be described with reference to the drawings. In the description of the drawings, the same elements are denoted by the same reference numerals, and redundant description is omitted.

First Embodiment

The configuration of a liquid discharge head according to an embodiment will be described with reference to FIGS. 1(A) and 1(B). FIGS. 1(A) and 1(B) are explanatory views illustrating the configuration of a liquid discharge head according to a first embodiment of the present embodiment. FIG. 1(A) is a schematic cross-sectional view of a liquid discharge head illustrating a state where a nozzle is closed, and FIG. 1(B) is a schematic cross-sectional view of the liquid discharge head illustrating a state where the nozzle is opened.

A liquid discharge head 100 (thereinafter, referred to as a head) includes a housing 110 and a nozzle plate 101 attached to one end portion of the housing 110.

The housing 110 includes multiple divided sub-housings, and in the present embodiment, the housing 110 includes three sub-housings, that is, a first housing 110*a*, a second housing 110*b*, and a third housing 110*c*.

A nozzle plate 101 is attached to a lower end portion of the third housing 110*c*, and a nozzle 102 that discharges a liquid is formed on the nozzle plate 101. The third housing 110*c* includes a liquid inlet 113 for feeding the liquid into the head, a liquid chamber 114 for temporarily storing the liquid fed from the liquid inlet 113, and a liquid outlet 115 for feeding the liquid out of the head.

The second housing 110*b* is joined to the end portion of the third housing 110*c* on aside opposite to a side where the nozzle plate 101 is attached. The second housing 110*b* includes a bearing 135 that supports a needle valve 131 described later so as to be movable in the opening and closing direction of the nozzle 102.

The first housing 110*a* is joined to an end portion of the second housing 110*b* on a side opposite to a joint side with the third housing 110*c*. The first housing 110*a* stores an actuator 132. The actuator 132 may be also referred to as a "driver". The configuration of the actuator 132 is not particularly limited as long as it can be displaced in a vertical direction in FIGS. 1(A) and 1(B) by applying a voltage, but in the present embodiment, a piezoelectric element that expands and contracts by voltage application is used as the actuator 132. The needle valve 131 and a fixing member 118 are provided at both end portions in the displacement direction (expansion/contraction direction) of the actuator 132 via an elastic member 133.

The elastic member 133 includes a frame portion 133*a* formed so as to surround the actuator 132, a spring portion 133*b* provided in a part of the frame portion 133*a*, and contact portions 133*c* and 133*d* that contact both ends of the actuator 132. The actuator 132 is sandwiched between the contact portion 133*c* and the contact portion 133*d* by the contraction force of the spring portion 133*b*, and is supported by the elastic member 133.

One end of the needle valve 131 is joined to a lower portion (opposite side of the contact portion 133*d*) of the frame portion 133*a* of the elastic member 133, and the other end of the needle valve 131 is provided so as to be able to contact the nozzle 102 in the nozzle plate 101.

The fixing member 118 contacts an upper portion (opposite side of the contact portion 133*c*) of the frame portion 133*a* of the elastic member 133, and the fixing member 118 is secured to the first housing 110*a* by a fixing portion 118*a*. That is, the fixing member 118 forms a securing point such that the elastic member 133 cannot move upward by the displacement (expansion and contraction) of the actuator 132.

As described above, the needle valve 131 and the actuator 132 are coaxially disposed via the elastic member 133, that is, disposed in series in a liquid discharge direction. Note that the elastic member 133 is not necessarily formed as an integrated member, and for example, the elastic member 133 may be configured by connecting the frame portion 133*a* and the spring portion 133*b* prepared as separate members. It is preferable to use a low expansion metal such as stainless steel or Invar for the elastic member 133.

A heat transfer layer 139 is provided between the actuator 132 and the contact portion 133*d* of the elastic member 133 and between the actuator 132 and the contact portion 133*c* of the elastic member 133. The configuration of the heat transfer layer 139 is not particularly limited as long as it can efficiently dissipate the heat of the actuator 132. For example, the heat transfer layer 139 is formed of a sheet material or a film material made of heat dissipating silicone, and is also formed by applying grease-like heat dissipating silicone obtained by blending a powder having high thermal conductivity with silicone oil.

In the first embodiment, the elastic member 133 may not be provided. In this case, the heat transfer layer 139 is provided between the actuator 132 and the needle valve 131 and between the actuator 132 and the fixing member 118.

Here, the needle valve 131 is an example of a "valve", and the actuator 132 is an example of a "driver".

In the above configuration, when a predetermined drive voltage is applied to the actuator 132, the actuator 132 contracts by ΔL from a position illustrated in FIG. 1(A) and changes to a position illustrated in FIG. 1(B). As a result, the elastic member 133 also deforms in a contraction direction, and the needle valve 131 attached to the elastic member 133 moves in a direction forming a gap G with respect to the nozzle plate 101. By the movement of the needle valve 131, the nozzle 102 is opened, and a fluid pressurized and supplied to the liquid chamber 114 is discharged as a droplet D from the nozzle 102.

Figure 2:
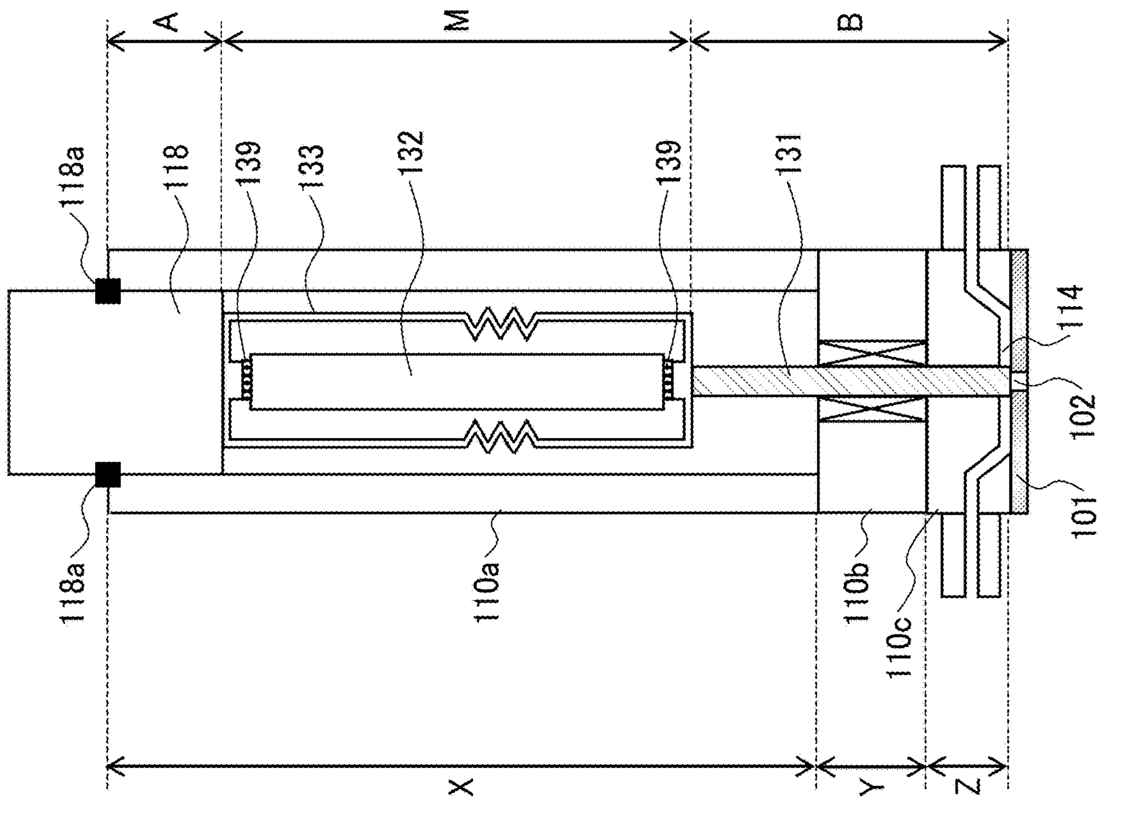
FIG. 2 is an explanatory view of distance variation due to the thermal deformation of the liquid discharge head.

Next, distance variation due to the thermal deformation of the liquid discharge head will be described with reference to FIG. 2. FIG. 2 is an explanatory view of distance variation due to the thermal deformation of the liquid discharge head.

The actuator 132 generates heat in accordance with the liquid discharge operation, and the heat causes the thermal deformation of the components of the head 100. When the components of the head 100 are thermally deformed and the needle valve 131 does not correctly contact the nozzle plate 101, a gap is generated between the needle valve 131 and the nozzle plate 101. This gap connects the liquid chamber 114 and the nozzle 102, causing a situation in which the liquid is constantly discharged from the nozzle 102.

In order to prevent such a situation, in the head of the first embodiment, the difference between the thermal fluctuation of the housing 110 and the thermal fluctuation of the stored member (needle valve 131, actuator 132, fixing member 118) stored in the housing 110 is configured to be close to 0. Strictly speaking, although thermal deformation also occurs in the elastic member 133, the thickness of the elastic member 133 is small in the longitudinal direction (liquid discharge direction), and the deformation amount is at a level that causes no disadvantage. Therefore, it is ignored here.

The thermal fluctuation of the housing 110 is, that is, distance fluctuation from the fixing portion 118*a* in the housing 110 to the inside of the nozzle plate 101, and is the fluctuation of the length of X+Y+Z in FIG. 2. Note that X is a length in the liquid discharge direction of the first housing 110*a*, Y is a length in the liquid discharge direction of the second housing 110*b*, and Z is a length in the liquid discharge direction of the third housing 110*c*.

The thermal fluctuation of the stored member stored in the housing 110 is, that is, distance fluctuation from the fixing portion 118*a* to the needle valve 131, and is the fluctuation of the length of A+M+B in FIG. 2. A is the length of the fixing member 118 in the liquid discharge direction, M is the length of the actuator 132 in the liquid discharge direction, and B is the length of the needle valve 131 in the liquid discharge direction.

In the first embodiment, only M (actuator 132) has a negative thermal expansion (contraction by heat) characteristic, so that materials other than M having a positive thermal expansion (expansion by heat) characteristic are used. That is, the fixing member 118 and the needle valve 131 are made of a material whose lengths A and B increase as the temperature rises, and a material having a reverse sign relationship with respect to the linear expansion coefficient of the actuator 132 is used. As a result, the amount by which the actuator 132 contracts due to the temperature rise of the actuator 132 and M decreases can be offset by the amount by which A (fixing member 118) and B (needle valve 131) increase. As a result, it is possible to prevent constant discharge and an increase in discharge caused by the gap between the needle valve 131 and the nozzle plate 101 due to the temperature rise of long-time drive.

At least one of a first housing 110*a*, a second housing 110*b*, and a third housing 110*c* may be made of a material having a low linear expansion coefficient, such as low expansion metal. Examples of the low expansion metal include Invar, which is an alloy of iron and nickel. As a result, it is possible to suppress distance variation (variation of X+Y+Z) that is received by a housing 110 from the heat generation of the actuator 132.

The second housing 110*b* sandwiched between the first housing 110*a* and the third housing 110*c* may have heat shielding properties. The heat shielding properties in the present embodiment mean a property of reflecting heat from the actuator 132. The heat shielding properties may be obtained by forming the second housing 110*b* itself with a heat shielding material, or by providing a sheet having a surface to which an aluminum foil, aluminum vapor deposition, or an aluminum film or the like is applied, on a surface of the second housing 110*b* requiring heat shielding. As a result, when the housing 110 is divided into multiple sub-housings, the processing accuracy of the entire housing 110 can be improved, and the distance variation (variation of X+Y+Z) of the housing 110 can be suppressed by sandwiching the housing having heat shielding properties. That is, since the second housing 110*b* bounces the heat, the heat is less likely to be transferred to the third housing 110*c*, and the fluctuation of Z can be made substantially 0.

Since the nozzle 102 on the nozzle plate 101 is required to be processed with high accuracy, it is desirable to process the nozzle plate 101 alone. In this case, it is necessary to chemically adhere the nozzle plate 101 on which the nozzle 102 is formed to the third housing 110*c* later. In the configuration in which the nozzle plate 101 is adhered to the third housing 110*c* later as described above, the third housing 110*c* and the nozzle plate 101 are preferably formed of the same material. As a result, it is possible to suppress the positional displacement of the nozzle plate 101 with respect to the third housing 110*c* due to thermal fluctuation.

As described above, according to the first embodiment, in the head 100 including the actuator 132 having a negative thermal expansion characteristic and the members around the actuator having a positive thermal expansion characteristic, the thermal displacement of the contact portion between the nozzle 102 provided on the housing 110 side and the needle valve 131 connected to the actuator 132 can be brought close to 0.

Although the configuration in which the actuator 132 has a negative thermal expansion characteristic (negative linear expansion coefficient) and the fixing member 118 and the needle valve 131 have a positive thermal expansion characteristic (positive linear expansion coefficient) has been described above, if the linear expansion coefficient of the actuator 132 and the linear expansion coefficients of the fixing member 118 and the needle valve 131 have opposite signs, it is possible to obtain a similar effect of bringing the thermal displacement of the contact portion between the nozzle 102 and the needle valve 131 close to 0. For example, the actuator 132 may be configured to have a positive thermal expansion characteristic (positive linear expansion coefficient), and the fixing member 118 and the needle valve 131 may be configured to have a negative thermal expansion characteristic (negative linear expansion coefficient).

As described above, the present embodiment includes the housing 110, the nozzle plate 101 attached to the housing 110 and formed with the nozzle 102 that discharges a liquid, the needle valve 131 that is stored in the housing 110 and opens and closes the nozzle 102, the actuator 132 that is provided at the end portion in the opening and closing direction of the needle valve 131 and drives the needle valve 131, and the fixing member 118 that is provided at the end portion in the driving direction of the actuator 132 and is secured to the housing 110. The linear expansion coefficient of the actuator 132 and the linear expansion coefficients of the needle valve 131 and the fixing member 118 have a reverse sign relationship, and the actuator 132 and the needle valve 131, and the actuator 132 and the fixing member 118 are connected via the heat transfer layer 139.

As a result, the fluctuation of the member due to the heat generation of the actuator 132 can be suppressed, and the target discharge state can be maintained.

As described above, the housing 110 is divided into multiple (three in the present embodiment) sub-housings, and at least one of the multiple divided sub-housings 110*a*, 110*b*, and 110*c* is made of Invar.

As a result, it is possible to suppress distance variation that is received by the housing 110 from the heat generation of the actuator 132.

As described above, the housing 110 is divided into three or more sub-housings, and the intermediate sub-housing (second housing 110*b*) among the multiple sub-housings 110*a*, 110*b*, and 110*c* has heat shielding properties.

As a result, the second housing 110*b* bounces heat and makes it difficult to transmit the heat to the third housing 110*c*, so that the variation of the third housing 110*c* can be made substantially 0.

As described above, the housing 110 and the nozzle plate 101 are chemically adhered, and the housing 110 and the nozzle plate 101 are made of the same material. In particular, the third housing 110*c* to which the nozzle plate 101 is adhered and the nozzle plate 101 are made of the same material.

As a result, it is possible to suppress the positional displacement of the nozzle plate 101 with respect to the third housing 110*c* due to thermal fluctuation.

Second Embodiment

Figure 3:
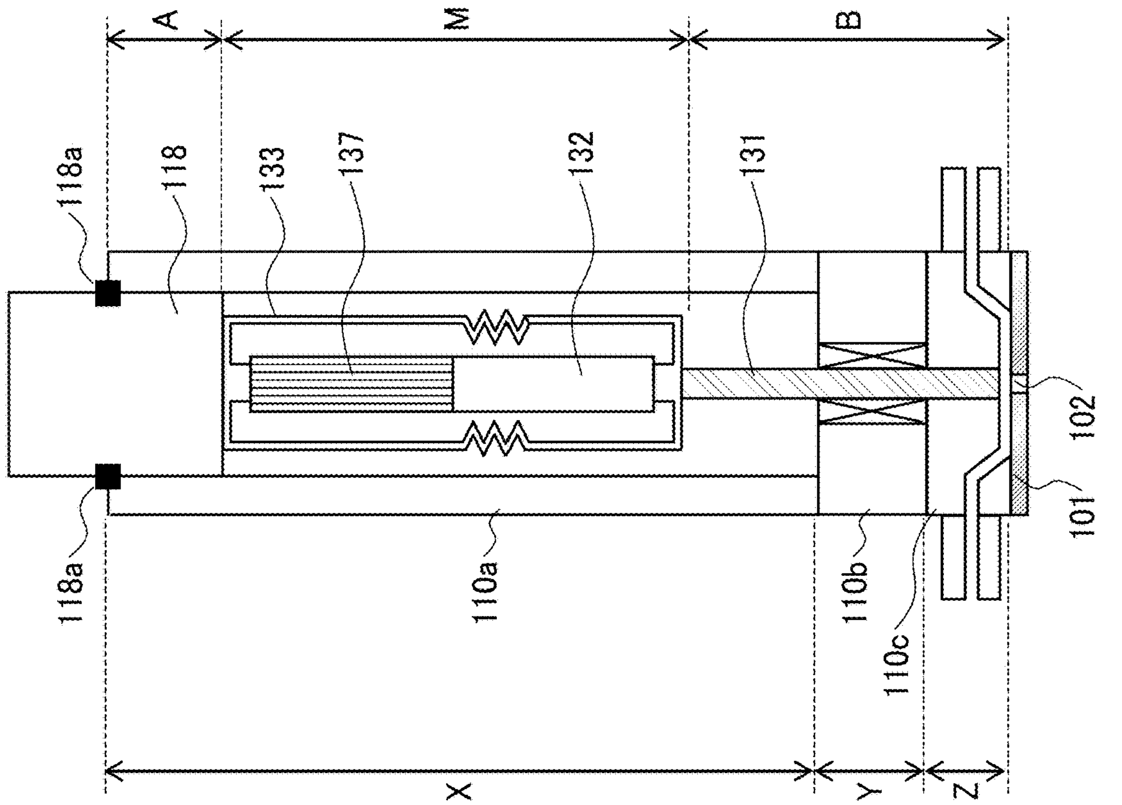
FIG. 3 is an explanatory view illustrating the configuration of a liquid discharge head according to a second embodiment of the present embodiment.

FIG. 3 is an explanatory view illustrating the configuration of a liquid discharge head according to a second embodiment of the present embodiment.

The second embodiment is different from the first embodiment in that an adjuster 137 is provided at an end portion in an expansion/contraction direction which is the driving direction of an actuator 132. The actuator 132 and the adjuster 137 are coaxially disposed, that is, in series in a liquid discharge direction. The adjuster 137 suppresses the thermal contraction of M due to the heat generation of the actuator 132 by using a material having a linear expansion coefficient in a reverse sign relationship with the actuator 132. As a result, the variation in the entire length of A+M+B can be reduced.

At least one of a first housing 110*a*, a second housing 110*b*, and a third housing 110*c* may be made of a material having a low linear expansion coefficient, such as low expansion metal. Examples of the low expansion metal include Invar, which is an alloy of iron and nickel. As a result, it is possible to suppress distance variation (variation of X+Y+Z) that is received by a housing 110 from the heat generation of the actuator 132.

The second housing 110*b* sandwiched between the first housing 110*a* and the third housing 110*c* may have heat shielding properties. The heat shielding properties in the present embodiment mean a property of reflecting heat from the actuator 132. The heat shielding properties may be obtained by forming the second housing 110*b* itself with a heat shielding material, or by providing a sheet having a surface to which an aluminum foil, aluminum vapor deposition, or an aluminum film or the like is applied, on a surface of the second housing 110*b* requiring heat shielding. As a result, when the housing 110 is divided into multiple sub-housings, the processing accuracy of the entire housing 110 can be improved, and the distance variation (variation of X+Y+Z) of the housing 110 can be suppressed by sandwiching the housing having heat shielding properties. That is, since the second housing 110*b* bounces the heat, the heat is less likely to be transferred to the third housing 110*c*, and the fluctuation of Z can be made substantially 0.

Since the nozzle 102 on the nozzle plate 101 is required to be processed with high accuracy, it is desirable to process the nozzle plate 101 alone. In this case, it is necessary to chemically adhere the nozzle plate 101 on which the nozzle 102 is formed to the third housing 110*c* later. In the configuration in which the nozzle plate 101 is adhered to the third housing 110*c* later as described above, the third housing 110*c* and the nozzle plate 101 are preferably formed of the same material. As a result, it is possible to suppress the positional displacement of the nozzle plate 101 with respect to the third housing 110*c* due to thermal fluctuation.

As described above, according to the second embodiment, in the head 100 including the actuator 132 having a negative thermal expansion characteristic and the members around the actuator having a positive thermal expansion characteristic, the thermal displacement of the contact portion between the nozzle 102 provided on the housing 110 side and the needle valve 131 connected to the actuator 132 can be brought close to 0.

Although the configuration in which the actuator 132 has a negative thermal expansion characteristic (negative linear expansion coefficient) and the adjuster 137 has a positive thermal expansion characteristic (positive linear expansion coefficient) has been described above, if the linear expansion coefficient of the actuator 132 and the linear expansion coefficient of the adjuster 137 have opposite signs, it is possible to obtain a similar effect of bringing the thermal displacement of the contact portion between the nozzle 102 and the needle valve 131 close to 0. For example, the actuator 132 may be configured to have a positive thermal expansion characteristic (positive linear expansion coefficient), and the adjuster 137 may be configured to have a negative thermal expansion characteristic (negative linear expansion coefficient).

As described above, the present embodiment includes the housing 110, the nozzle plate 101 attached to the housing

110 and formed with the nozzle 102 that discharges a liquid, the needle valve 131 that is stored in the housing 110 and opens and closes the nozzle 102, the actuator 132 that is provided at the end portion in the opening and closing direction of the needle valve 131 and drives the needle valve 131, the adjuster 137 attached to the end portion in the driving direction of the actuator 132, and the fixing member 118 that is provided at the end portion of the adjuster 137 and secured to the housing 110. The linear expansion coefficient of the actuator 132 and the linear expansion coefficients of the needle valve 131, the adjuster 137, and the fixing member 118 have a reverse sign relationship.

As a result, the fluctuation of the member due to the heat generation of the actuator 132 can be suppressed, and the target discharge state can be maintained.

As described above, the housing 110 is divided into multiple (three in the present embodiment) sub-housings, and at least one of the multiple divided sub-housings 110*a*, 110*b*, and 110*c* is made of invar.

As a result, it is possible to suppress distance variation that is received by the housing 110 from the heat generation of the actuator 132.

As described above, the housing 110 is divided into three or more sub-housings, and the intermediate sub-housing (second housing 110*b*) among the multiple sub-housings 110*a*, 110*b*, and 110*c* has heat shielding properties.

As a result, the second housing 110*b* bounces heat and makes it difficult to transmit the heat to the third housing 110*c*, so that the variation of the third housing 110*c* can be made substantially 0.

As described above, the housing 110 and the nozzle plate 101 are chemically adhered, and the housing 110 and the nozzle plate 101 are made of the same material. In particular, the third housing 110*c* to which the nozzle plate 101 is adhered and the nozzle plate 101 are made of the same material.

As a result, it is possible to suppress the positional displacement of the nozzle plate 101 with respect to the third housing 110*c* due to thermal fluctuation.

Third Embodiment

Figure 4B:
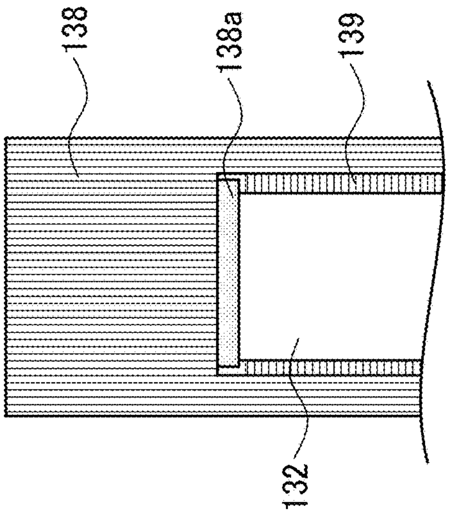
FIGS. 4A and 4B are explanatory views illustrating the configuration of a liquid discharge head according to a third embodiment of the present embodiment.
Figure 4A:
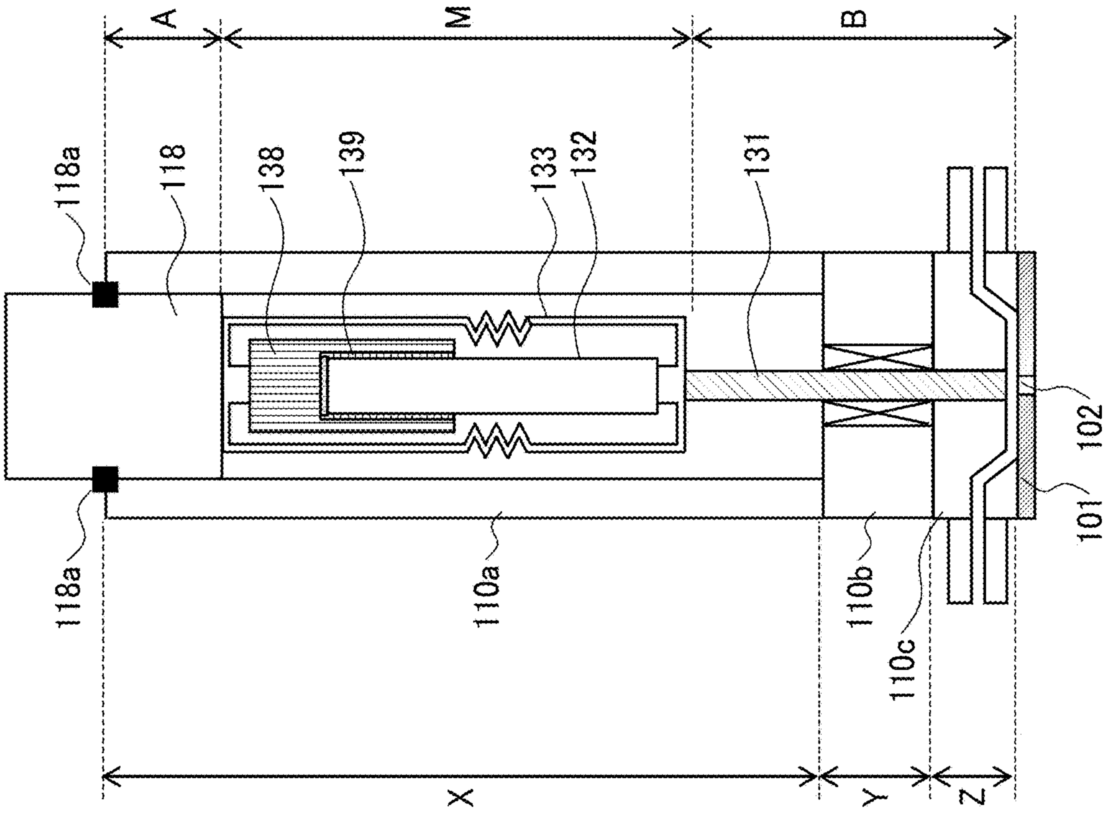

FIGS. 4A and 4B are explanatory views illustrating the configuration of a liquid discharge head according to a third embodiment of the present embodiment. FIG. 4A is a schematic cross-sectional view of the liquid discharge head, and FIG. 4B is an enlarged view of a joint portion between an actuator and an adjuster.

The third embodiment is different from the second embodiment in that an adjuster 138 provided at the end portion of an actuator 132 is joined so as to cover the end portion of the actuator 132. In the joining of the actuator 132 and the adjuster 138, as illustrated in FIG. 4B, a joint portion 138*a* is preferably only a surface intersecting with an expansion/contraction direction so as not to hinder the expansion/contraction operation of the actuator 132.

A heat transfer layer 139 is provided in a gap between the actuator 132 and the adjuster 138 excluding the joint portion 138*a*. The configuration of the heat transfer layer 139 is not particularly limited as long as it can efficiently dissipate the heat of the actuator 132. For example, the heat transfer layer 139 is formed of a sheet material or a film material made of heat dissipating silicone, and is also formed by applying grease-like heat dissipating silicone obtained by blending a powder having high thermal conductivity with silicone oil. As a result, the heat of the actuator 132 is more easily transferred to the adjuster 138, and the thermal contraction of M due to the heat generation of the actuator 132 can be suppressed.

At least one of a first housing 110*a*, a second housing 110*b*, and a third housing 110*c* may be made of a material having a low linear expansion coefficient, such as low expansion metal. Examples of the low expansion metal include Invar, which is an alloy of iron and nickel. As a result, it is possible to suppress distance variation (variation of X+Y+Z) that is received by a housing 110 from the heat generation of the actuator 132.

The second housing 110*b* sandwiched between the first housing 110*a* and the third housing 110*c* may have heat shielding properties. The heat shielding properties in the present embodiment mean a property of reflecting heat from the actuator 132. The heat shielding properties may be obtained by forming the second housing 110*b* itself with a heat shielding material, or by providing a sheet having a surface to which an aluminum foil, aluminum vapor deposition, or an aluminum film or the like is applied, on a surface of the second housing 110*b* requiring heat shielding. As a result, when the housing 110 is divided into multiple sub-housings, the processing accuracy of the entire housing 110 can be improved, and the distance variation (variation of X+Y+Z) of the housing 110 can be suppressed by sandwiching the housing having heat shielding properties. That is, since the second housing 110*b* bounces the heat, the heat is less likely to be transferred to the third housing 110*c*, and the fluctuation of Z can be made substantially 0.

Since the nozzle 102 on the nozzle plate 101 is required to be processed with high accuracy, it is desirable to process the nozzle plate 101 alone. In this case, it is necessary to chemically adhere the nozzle plate 101 on which the nozzle 102 is formed to the third housing 110*c* later. In the configuration in which the nozzle plate 101 is adhered to the third housing 110*c* later as described above, the third housing 110*c* and the nozzle plate 101 are preferably formed of the same material. As a result, it is possible to suppress the positional displacement of the nozzle plate 101 with respect to the third housing 110*c* due to thermal fluctuation.

As described above, according to the third embodiment, in the head 100 including the actuator 132 having a negative thermal expansion characteristic and the members around the actuator having a positive thermal expansion characteristic, the thermal displacement of the contact portion between the nozzle 102 provided on the housing 110 side and the needle valve 131 connected to the actuator 132 can be brought close to 0.

Although the configuration in which the actuator 132 has a negative thermal expansion characteristic (negative linear expansion coefficient) and the adjuster 137 has a positive thermal expansion characteristic (positive linear expansion coefficient) has been described above, if the linear expansion coefficient of the actuator 132 and the linear expansion coefficient of the adjuster 137 have opposite signs, it is possible to obtain a similar effect of bringing the thermal displacement of the contact portion between the nozzle 102 and the needle valve 131 close to 0. For example, the actuator 132 may be configured to have a positive thermal expansion characteristic (positive linear expansion coefficient), and the adjuster 137 may be configured to have a negative thermal expansion characteristic (negative linear expansion coefficient).

As described above, the present embodiment includes the housing 110, the nozzle plate 101 attached to the housing 110 and formed with the nozzle 102 that discharges a liquid, the needle valve 131 that is stored in the housing 110 and opens and closes the nozzle 102, the actuator 132 that is provided at the end portion in the opening and closing direction of the needle valve 131 and drives the needle valve 131, the adjuster 138 attached to the end portion in the driving direction of the actuator 132, and the fixing member 118 that is provided at the end portion of the adjuster 138 and secured to the housing 110. The linear expansion coefficient of the actuator 132 and the linear expansion coefficients of the needle valve 131, the adjuster 138, and the fixing member 118 have a reverse sign relationship.

As a result, the fluctuation of the member due to the heat generation of the actuator 132 can be suppressed, and the target discharge state can be maintained.

As described above, the actuator 132 and the adjuster 138 are connected via the heat transfer layer 139.

As a result, the heat of the actuator 132 is more easily transferred to the adjuster 138, and the thermal contraction due to the heat generation of the actuator 132 can be suppressed.

As described above, the housing 110 is divided into multiple (three in the present embodiment) sub-housings, and at least one of the multiple divided sub-housings 110*a*, 110*b*, and 110*c* is made of Invar.

As a result, it is possible to suppress distance variation that is received by the housing 110 from the heat generation of the actuator 132.

As described above, the housing 110 is divided into three or more sub-housings, and the intermediate sub-housing (second housing 110*b*) among the multiple sub-housings 110*a*, 110*b*, and 110*c* has heat shielding properties.

As a result, the second housing 110*b* bounces heat and makes it difficult to transmit the heat to the third housing 110*c*, so that the variation of the third housing 110*c* can be made substantially 0.

As described above, the housing 110 and the nozzle plate 101 are chemically adhered, and the housing 110 and the nozzle plate 101 are made of the same material. In particular, the third housing 110*c* to which the nozzle plate 101 is adhered and the nozzle plate 101 are made of the same material.

As a result, it is possible to suppress the positional displacement of the nozzle plate 101 with respect to the third housing 110*c* due to thermal fluctuation.

Application Example

Figure 5:
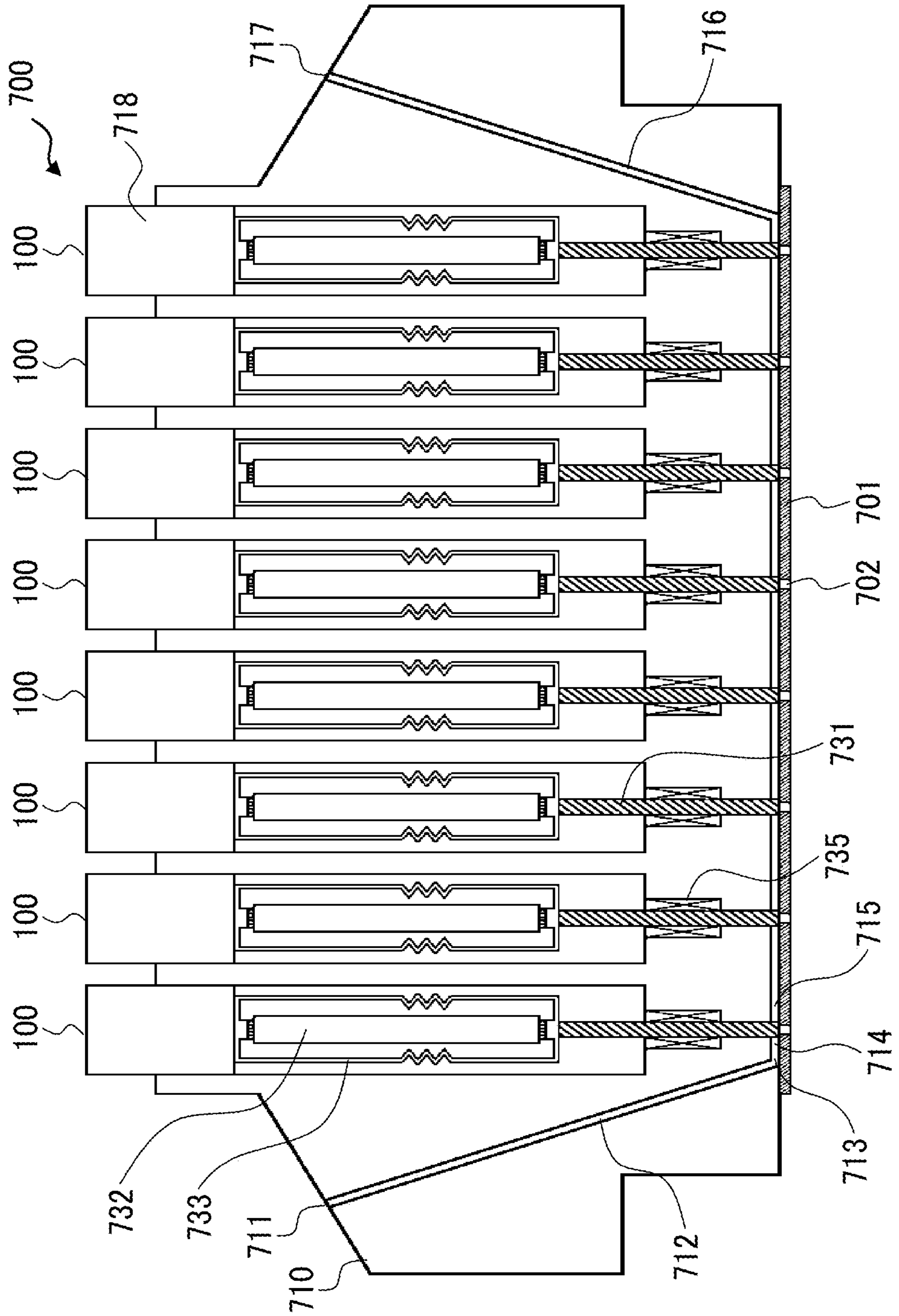
FIG. 5 is an explanatory view illustrating an application example.

Next, an application example will be described with reference to FIG. 5. FIG. 5 is an explanatory view illustrating the application example.

As illustrated in FIG. 5, a head module 700 includes multiple (eight in this example) heads 100 in a housing 710. The housing 710 includes a supply port 711 for supplying a liquid into the housing 710, a supply path 712 connecting the supply port 711 and a liquid inlet 713, and a liquid outlet 715 provided on the opposite side of the liquid inlet 713 across a liquid chamber 714. The housing 710 includes a collection port 717 for collecting the liquid in the housing 710, and a collection path 716 connecting the collection port 717 and the liquid outlet 715.

For the multiple heads 100, FIG. 5 illustrates the head illustrated in the above-described first embodiment, but it is of course possible to implement the head described in the second embodiment or the third embodiment. The basic configuration of the head 100 is similar to that described in FIGS. 1(A) and 1(B) to 4A and 4B, and in FIG. 5, corresponding elements are denoted by reference numerals in the 700 series.

In the present application example, the eight heads 100 are provided such that respective nozzles 702 are arranged at substantially equal intervals in one direction (left-right direction in FIG. 5). Each of the heads 100 is provided to extend in the vertical direction so as to discharge the liquid downward from the nozzles 702 in the lower part of FIG. 5.

The liquid chamber 714 of each head 100 is provided to penetrate so that the liquid flows from one side (left side in FIG. 5) to the other side (right side in FIG. 5) in the arrangement direction of the eight heads 100.

[Application Example of Head Module]

Figure 6:
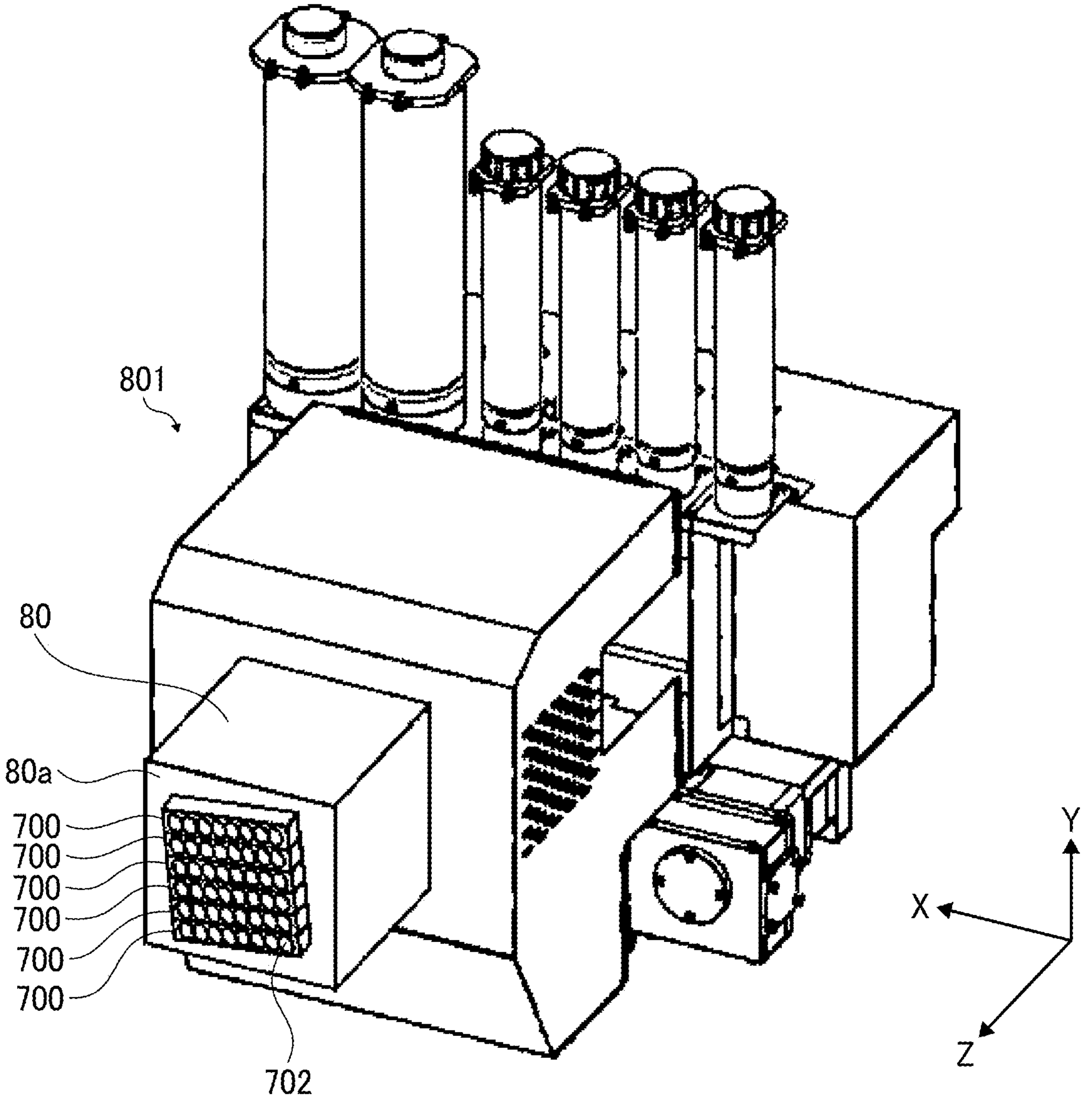
FIG. 6 is an overall perspective view illustrating an example of a carriage.
Figure 7:
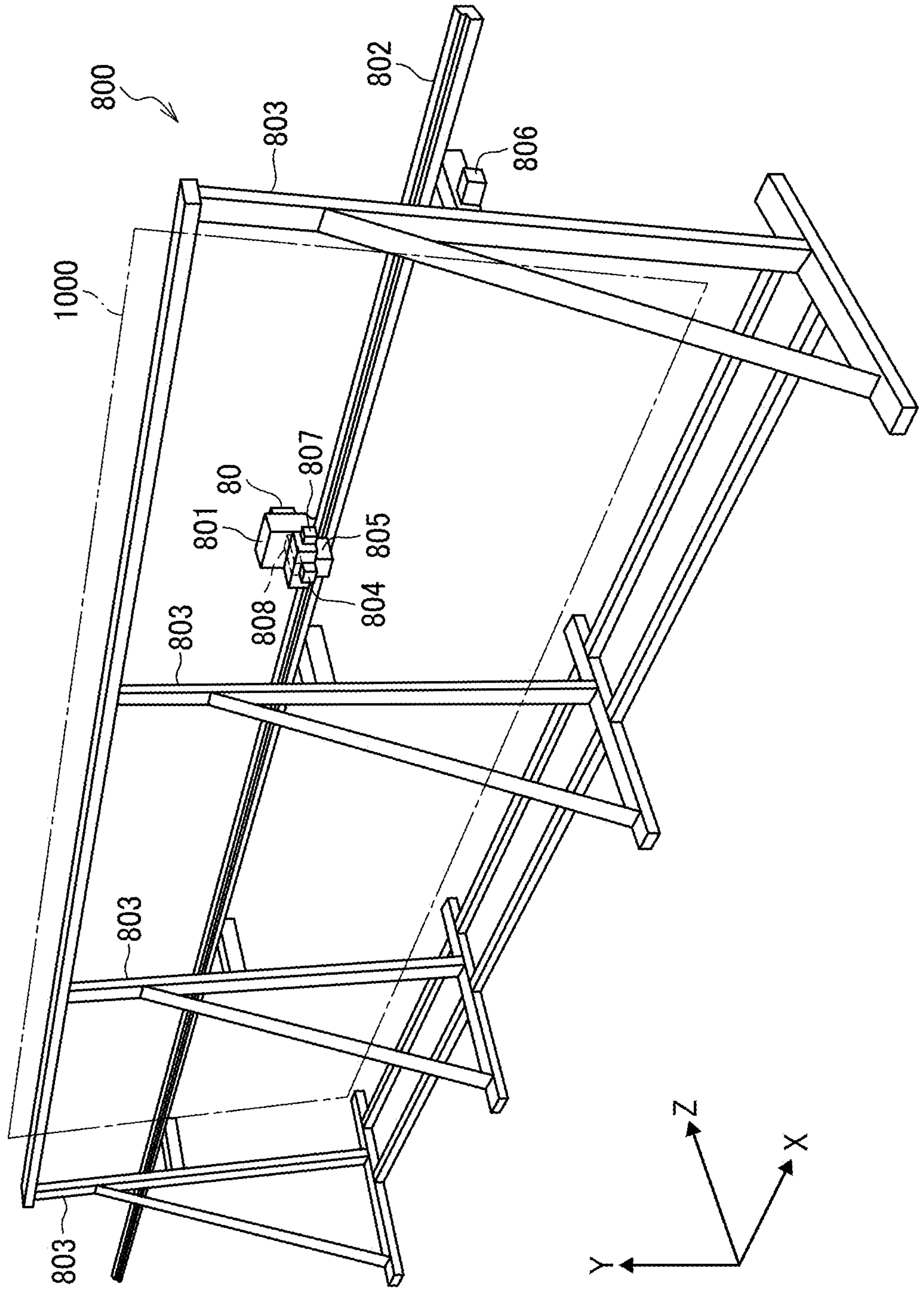
FIG. 7 is an overall perspective view illustrating an example of a liquid discharge apparatus.

Next, an application example of the head module 700 described in FIG. 5 will be described with reference to FIGS. 6 and 7. FIG. 6 is an overall perspective view illustrating an example of a carriage, and FIG. 7 is an overall perspective view illustrating an example of a liquid discharge apparatus on which the carriage of FIG. 6 is mounted. FIG. 6 illustrates a carriage 801 mounted on a printing apparatus 800 (liquid discharge apparatus) illustrated in FIG. 7 as viewed from a liquid discharge object 1000 side.

The carriage 801 includes a head holder 80. The carriage 801 is movable in a Z direction (positive side and negative side) along a Z-axis rail 804 by power from a first Z-direction driving unit 807 described later.

The head holder 80 is movable in the Z-direction (positive side and negative side) with respect to the carriage 801 by power from a second Z-direction driving unit 808 described later. The head holder 80 includes a head securing plate 80*a* to which the head module 700 is attached.

In the present application example, a configuration in which six head modules 700 described in FIG. 5 are attached to the head securing plate 80*a* is exemplified, and the six head modules 700 are provided side by side in a stacked manner.

Each of the head modules 700 includes multiple nozzles 702. Note that the type and number of colors of inks used in the head modules 700 may be different for each of the head modules, or all the inks may have the same color. For example, when the printing apparatus 800 (liquid discharge apparatus) is a coating apparatus using a single color, the inks used in the six head modules 700 may have the same color. The number of the head modules 700 is not limited to 6. The number may be more than 6 or less than 6.

The head module 70) is secured to the head securing plate 80*a* in a state where a nozzle row (a row formed by eight nozzles 702) of each head module intersects with a horizontal plane (X-Z plane) and the arrangement direction of the multiple nozzles 702 is inclined with respect to an X axis. In this state, the nozzle 702 discharges the liquid in a direction (positive side in the Z direction) intersecting with the gravity direction.

The printing apparatus 800 as an example of the liquid discharge apparatus illustrated in FIG. 7 is installed to face the liquid discharge object 1000. The printing apparatus 800 includes an X-axis rail 802, a Y-axis rail 803 intersecting with the X-axis rail 802, and a Z-axis rail 804 intersecting with the X-axis rail 802 and the Y-axis rail 803.

The Y-axis rail 803 holds the X-axis rail 802 such that the X-axis rail 802 is movable in a Y direction (positive side and negative side). The X-axis rail 802 holds the Z-axis rail 804 such that the Z-axis rail 804 is movable in an X direction (positive side and negative side). The Z-axis rail 804 holds the carriage 801 such that the carriage 801 is movable in the Z direction (positive side and negative side).

The printing apparatus 800 includes a first Z-direction driving unit 807 that causes the carriage 801 to move in the Z direction along the Z-axis rail 804, and an X-direction driving unit 805 that causes the Z-axis rail 804 to move in the X direction along the X-axis rail 802. The printing apparatus 800 includes a Y-direction driving unit 806 that causes the X-axis rail 802 to move in the Y direction along the Y-axis rail 803. The printing apparatus 800 further includes a second Z-direction driving unit 808 that causes the head holder 80 to move in the Z direction with respect to the carriage 801.

The printing apparatus 800 configured as described above discharges ink as an example of a liquid from the head module 70) (see FIG. 6) provided in the head holder 80 to perform printing on the liquid discharge object 1000 while causing the carriage 801 to move in the X direction, the Y direction, and the Z direction. The movement of the carriage 801 and the head holder 80 in the Z direction does not necessarily mean parallel to the Z direction, and may be oblique movement as long as the movement includes at least a component in the Z direction.

In FIG. 6, the surface shape of the liquid discharge object 1000 is a flat surface, but the surface shape of the liquid discharge object 1000 may be a surface close to a vertical direction such as a vehicle body of a vehicle or a truck, or a body of an aircraft, a surface having a large radius of curvature, or a surface having some irregularities.

In the present embodiment, examples of the liquid include solutions, suspensions, and emulsions containing solvents such as water and organic solvents, colorants such as dyes and pigments, function-imparting materials such as polymerizable compounds, resins, and surfactants, biocompatible materials such as deoxyribonucleic acid (DNA), amino acids, proteins, and calcium, and edible materials such as natural pigments, and the like.

These can be used for, for example, inkjet inks, paint coating materials, surface treatment liquids, constituent elements of electronic elements and light emitting elements, liquids for forming electronic circuit resist patterns, and material liquids for three-dimensional modeling, and the like.

The liquid discharge apparatus according to the present embodiment is not limited to the form of the printing apparatus described above. For example, the head module (or head) of the present embodiment may be attached to the tip of a robot arm of an articulated robot capable of freely moving like a human arm by multiple joints. The liquid discharge apparatus is not limited to the apparatus configured to cause the head to move with respect to the liquid discharge object. The head and the liquid discharge object only need to be relatively movable, and the liquid discharge object may be configured to move with respect to the head.

The above description is an example, and the present embodiment has specific effects for each of the following aspects.

[First Aspect]

A liquid discharge head as a first aspect includes a housing (for example, a housing 110), a nozzle plate (for example, a nozzle plate 101) attached to the housing and provided with a nozzle for discharging a liquid, a valve (for example, a needle valve 131) that is stored in the housing and opens and closes the nozzle, a driver (for example, an actuator 132) that is provided at an end portion of the valve in an opening and closing direction and drives the valve; and a fixing member (for example, a fixing member 118) provided at an end portion of the driver in a driving direction and secured to the housing, wherein a linear expansion coefficient of the driver and linear expansion coefficients of the valve and the fixing member have a reverse sign relationship, and the driver and the valve, and the driver and the fixing member are connected via a heat transfer layer (for example, a heat transfer layer 139).

[Second Aspect]

A liquid discharge head as a second aspect includes a housing (for example, a housing 110), a nozzle plate (for example, a nozzle plate 101) attached to the housing and provided with a nozzle for discharging a liquid, a valve (for example, a needle valve 131) that is stored in the housing and opens and closes the nozzle, a driver (for example, an actuator 132) that is provided at an end portion of the valve in an opening and closing direction and drives the valve, an adjuster (for example, an adjuster 137) attached to an end portion of the driver in a driving direction, and a fixing member (for example, a fixing member 118) provided at an end portion of the adjuster and secured to the housing, wherein a linear expansion coefficient of the driver and linear expansion coefficients of the valve, the adjuster, and the fixing member have a reverse sign relationship.

According to the first aspect and the second aspect, it is possible to suppress the fluctuation of the member due to the heat generation of the driver and maintain the target discharge state.

[Third Aspect]

In the liquid discharge head as a third aspect, in the second aspect, the driver (for example, the actuator 132) and the adjuster (for example, the adjuster 138) are connected via a heat transfer layer (for example, a heat transfer layer 139).

According to the third aspect, the heat of the driver is more easily transferred to the adjuster, and the thermal contraction of the driver itself due to the heat generation of the driver can be suppressed.

[Fourth Aspect]

In the liquid discharge head as a fourth aspect, in the first aspect or the second aspect, the housing (for example, the housing 110) is divided into multiple sub-housings, and at least one of the multiple divided sub-housings (for example, a first housing 110*a*, a second housing 110*b*, and a third housing 110*c*) is made of Invar.

According to the fourth aspect, it is possible to suppress distance variation that is received by the housing from the heat generation of the driver.

[Fifth Aspect]

In the liquid discharge head as a fifth aspect, in the first aspect or the second aspect, the housing (for example, the housing 110) is divided into three or more sub-housings, and an intermediate sub-housing (for example, a second housing 110*b*) among the multiple sub-housings (for example, a first housing 110*a*, a second housing 110*b*, and a third housing 110*c*) has heat shielding properties.

According to the fifth aspect, the intermediate housing bounces heat and makes it difficult to transmit the heat to the downstream housing, so that the fluctuation of the downstream housing can be made substantially zero.

[Sixth Aspect]

In the liquid discharge head as a sixth aspect, in the first aspect or the second aspect, the housing (for example, the housing 110) and the nozzle plate (for example, the nozzle plate 101) are chemically adhered, and the housing and the nozzle plate are made of the same material.

According to the sixth aspect, it is possible to suppress the positional displacement of the nozzle plate with respect to the housing due to thermal fluctuation.

[Aspect 7]

A liquid discharge head (100) includes: a housing (110); a nozzle plate (101) attached to the housing (110), the nozzle plate (101) having a nozzle (102) from which a liquid is to be discharged; a valve (131) in the housing (110), the valve (131) configured to move in an opening and closing direction and openably close the nozzle (102); a driver (132) having one end coupled to the valve (131) in the opening and closing direction, the driver (132) configured to drive the valve (131); and a fixing member (118) fixed to the housing (110) and coupled to another end of the driver (132) in the opening and closing direction, wherein the driver (132) has a first linear expansion coefficient, each of the valve (131) and the fixing member (118) has a second linear expansion coefficient, the first linear expansion coefficient and the second linear expansion coefficient are reversed in positivity and negativity, and the driver (132) is coupled to each of the valve (131) and the fixing member (118) via a heat transfer layer (139).

[Aspect 8]

The liquid discharge head (100) according to claim 7, further includes an adjuster (137, 138) between the fixing member and said another end of the driver, wherein the driver (132) has a first linear expansion coefficient, each of the valve (131), the adjuster (137, 138), and the fixing member (118) has a second linear expansion coefficient, and the first linear expansion coefficient and the second linear expansion coefficient are reversed in positivity and negativity.

[Aspect 9]

In the liquid discharge head (100) according to claim 8, the driver and the adjuster (137, 138) are coupled via the heat transfer layer (139).

[Aspect 10]

In the liquid discharge head (100) according to claim 7 or 8, the housing (110) includes multiple sub-housings, and at least one of the multiple sub-housings is made of Invar.

[Aspect 11]

In the liquid discharge head (100) according to claim 7 or 8, the housing (110) includes three or more sub-housings, and the three or more sub-housings includes an intermediate sub-housing has heat shielding property.

[Aspect 12]

In the liquid discharge head (100) according to claim 7 or 8, the housing (110) and the nozzle plate (101) are chemically adhered, and the housing (110) and the nozzle plate (101) are made of the same material.

[Aspect 13]

In the liquid discharge head (100) according to claim 7 or 8, the adjuster covers said another end of the driver.

[Aspect 14]

A head module (700) includes multiple liquid discharge heads (100) including the liquid discharge head according to any one of claims 7 to 13.

[Aspect 15]

A liquid discharge apparatus includes the liquid discharge head (100) according to any one of claims 7 to 13.

[Aspect 16]

A liquid discharge apparatus includes the head module (700) according to claim 14.

[Aspect 17]

A liquid discharge head (100) includes: a housing (110); a nozzle plate (101) attached to the housing (110), the nozzle plate (101) having a nozzle (102) from which a liquid is to be discharged; a valve (131) in the housing (110), the valve (131) configured to move in an opening and closing direction and openably close the nozzle (102); a driver (132) having one end coupled to the valve (131) in the opening and closing direction, the driver configured to drive the valve (131); a fixing member (118) fixed to the housing (110) and coupled to another end of the driver (132) in the opening and closing direction; and an adjuster (137, 138) between the fixing member (118) and said another end of the driver (132), wherein the driver (132) has a first linear expansion coefficient, each of the valve (131), the adjuster) 137, 138), and the fixing member (118) has a second linear expansion coefficient, and the first linear expansion coefficient and the second linear expansion coefficient are reversed in positivity and negativity.

Numerous additional modifications and variations are possible in light of the above teachings. Such modifications and variations are not to be regarded as a departure from the scope of the present disclosure and appended claims, and all such modifications are intended to be included within the scope of the present disclosure and appended claims.

What is claimed is:

1. A liquid discharge head comprising:
a housing;
a nozzle plate attached to the housing, the nozzle plate having a nozzle from which a liquid is to be discharged;
a valve in the housing, the valve configured to move in an opening and closing direction and open and close the nozzle;
a driver having one end coupled to the valve in the opening and closing direction, the driver configured to drive the valve; and
a fixing member fixed to the housing and coupled to another end of the driver in the opening and closing direction,
wherein the driver has a first linear expansion coefficient,
each of the valve and the fixing member has a second linear expansion coefficient,
the first linear expansion coefficient is one of positive and negative and the second linear expansion coefficient is the other of positive and negative, and
the driver is coupled to each of the valve and the fixing member via a heat transfer layer.

2. The liquid discharge head according to claim 1, further comprising an adjuster between the fixing member and said another end of the driver,
wherein
the adjuster has the second linear expansion coefficient.

3. The liquid discharge head according to claim 2,
wherein the driver and the adjuster are coupled via the heat transfer layer.

4. The liquid discharge head according to claim 2,
wherein the adjuster covers said another end of the driver.

5. The liquid discharge head according to claim 1,
wherein the housing includes multiple sub-housings, and at least one of the multiple sub-housings is made of Invar.

6. The liquid discharge head according to claim 1,
wherein the housing includes three or more sub-housings, and
the three or more sub-housings includes an intermediate sub-housing which has a heat shielding property.

7. The liquid discharge head according to claim 1,
wherein the housing and the nozzle plate are chemically adhered, and
the housing and the nozzle plate are made of the same material.

8. A head module comprising multiple liquid discharge heads comprising the liquid discharge head according to claim 1.

9. A liquid discharge apparatus comprising the head module according to claim 8.

10. A liquid discharge apparatus comprising the liquid discharge head according to claim 1.

11. A liquid discharge head comprising:
a housing;
a nozzle plate attached to the housing, the nozzle plate having a nozzle from which a liquid is to be discharged;
a valve in the housing, the valve configured to move in an opening and closing direction and open and close the nozzle;
a driver having one end coupled to the valve in the opening and closing direction, the driver configured to drive the valve; and
a fixing member fixed to the housing and coupled to another end of the driver in the opening and closing direction, wherein
the driver has a first linear expansion coefficient,
the valve has a second linear expansion coefficient,
the fixing member has a third linear expansion coefficient,
the first linear expansion coefficient is one of positive and negative,
each of the second linear expansion coefficient and the third expansion coefficient is the other of positive and negative, and
the driver is coupled to each of the valve and the fixing member via a heat transfer layer.

12. The liquid discharge head according to claim 11, further comprising an adjuster between the fixing member and said another end of the driver,
wherein the adjuster has a fourth linear expansion coefficient which is the other of positive and negative.

13. A head module comprising multiple liquid discharge heads comprising the liquid discharge head according to claim 11.

14. A liquid discharge apparatus comprising the head module according to claim 13.

15. A liquid discharge apparatus comprising the liquid discharge head according to claim 11.

* * * * *